3,549,660
PROCESS FOR PRODUCING LOW-POLYMER
REACTION PRODUCTS
Gerhard Künstle and Herbert Siegl, Burghausen, Upper
Bavaria, Germany, assignors to Wacker - Chemie
G.m.b.H., Munich, Bavaria, Germany, a corporation of
Germany
Filed Dec. 13, 1967, Ser. No. 690,343
Claims priority, application Germany, Dec. 23, 1966,
W 43,055
Int. Cl. C07d 3/00
U.S. Cl. 260—343.9     4 Claims

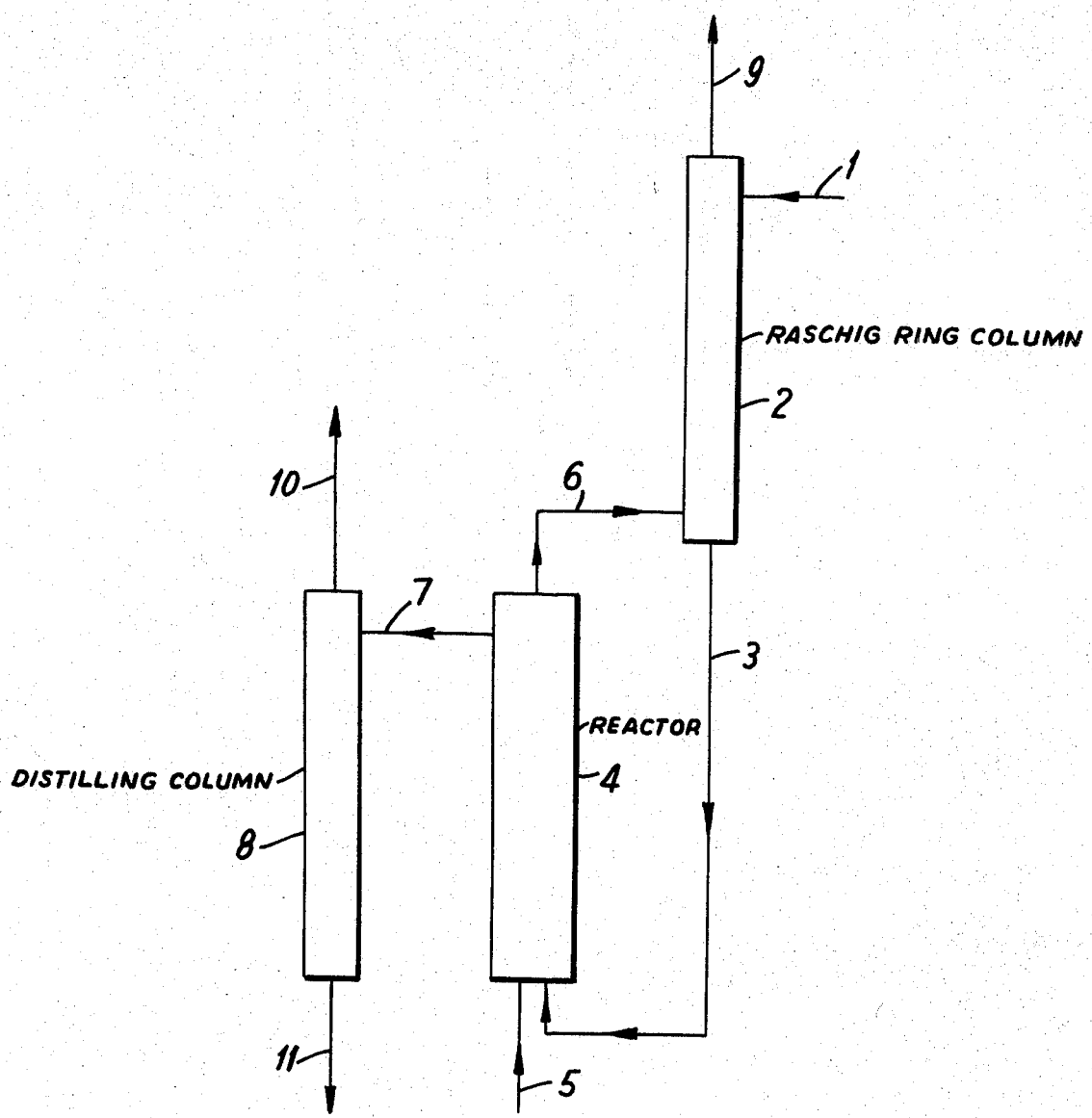

ABSTRACT OF THE DISCLOSURE

This invention relates to producing low-polymer reaction products, and it has for its object to provide a novel and improved process for this purpose.

BACKGROUND OF THE INVENTION

It is known that when reacting ketene with crotonaldehyde in the presence of suitable catalysts one obtains a reaction product preponderantly in polymer form.

One uses for this either acid condensing agents, e.g. Friedel-Crafts catalysts (see U.S. Pats. No. 2,356,459, No. 2,450,117, No. 2,450,118, No. 2,450,134, No. 2,469,690 and No. 2,484,067) or neutral salts, e.g., fatty acid salts of bivalent metals of the II to the VIII sub group of the Periodic System, particularly zinc salts (see DAS No. 1,042,573).

These compounds supply valuable storable products from which one obtains carboxylic acids in the known manner by depolymerization or rearrangement.

It has been further proposed to carry out this conversion in the presence of tetraalkyl titanates or of their condensation products as catalysts.

SUMMARY OF THE INVENTION

We have now discovered a process for producing low-polymer reaction products of the general formula:

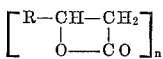

where R=H, alkyl, cycloalkyl, aryl or aralkyl, and $n=2-35$, preferably 2–20,
by reacting ketene with aldehydes, except crotonaldehyde. The process is characterized by the fact that tetraalkyl titanates or their condensation products are used as catalysts, where the alkyl groups are straight-chained or branched and contain 2–18 C atoms and one works within a temperature range of 20–110° C.

DESCRIPTION OF THE PREFERRED EMBODIMENTS

Suitable for carrying out the process are not only unsaturated aldehydes, e.g., acrolein, but also saturated aliphatic or also aromatic aldehydes, e.g., formaldehyde, acetaldehyde, propionaldehyde, n- and iso-butyraldehyde, diethylacetaldehyde, capronic aldehyde, benzaldehyde, m- and p-toluylaldehyde, phenylacetaldehyde or furfurol.

As examples, the following tetraalkyl titanates are named, for instance: tetraethyl titanate, tetra-n-propyl titanate, tetra-i-propyl titanate, tetra-n-butyl titanate, tetra-i-butyl titanate, tetra-n-hexyl titanate, tetra-i-octyl titanate and tetra-stearyl titanate; but also condensed tetraalkyl titanates, for instance polydipropyl-titanate or poly-dibutyl-titanate can be used successfully.

When carrying out the process it is expedient to use the tetraalkyl titanates in quantities of 0.5 to 5%, referred to the aldehyde used.

For carrying out the process it is advantageous to use the aldehyde in water-free form if possible. Generally it is sufficient to use technical aldehyde which has largely been freed of water by distilling. If necessary, the aldehyde can be compounded before the conversion with small quantities of a steric hindranced phenol, e.g., with 2,6-di-tert.-butyl-p-cresol. For such purpose quantities of 0.01–1%, referred to the aldehyde used, have been found to be sufficient.

In order to achieve a good assimilation of ketene it is sufficient to use the two starting compounds in stoichiometric quantities. However, in most cases it has been found useful to use the aldehyde in excess.

Ketene can be used in technically pure form. Particularly suitable, however, is a ketene which has been obtained as described in German Pat. No. 1,079,623 or as per DAS No. 1,203,248.

The accompanying drawing is a diagrammatic illustration of a system for carrying out the process of the invention.

The process is carried out as follows, with reference to the drawing: Gaseous ketene is piped into the lower part of reactor 4 through line 5. At the same time a catalyst-containing aldehyde is piped in from below through line 5. The residual gas, escaping from reactor 4 through the degassing pipe 6, which can still contain small quantities of aldehydes and ketene, is carried into a Raschig ring column 2 connected after reactor 4 toward the catalyst-containing aldehyde input. While at the upper end of column 2 a residual gas that is practically free of aldehydes and ketene escapes through line 9, the runoff of column 2 (catalyst-containing aldehyde) is carried by line 3 to the lower end of reactor 4. The staying time can be set by an overflow pipe 7 at the upper end of reactor 4. This can vary within wide limits.

The reaction product obtained at the reactor overflow 7 is separated, for instance, continuously in a thin layer vacuum distilling column 8 from the aldehyde which may be excessive; the latter is recovered in practically pure form and can be carried back for conversion again.

The resulting reaction products are always oily, sometimes highly viscous liquids.

The process of the invention permits work at high reaction temperatures. This makes the addition of thinners unnecessary. Also, the reaction speed is increased, so that a high throughput can be achieved. Also it has been found that no significant quantities of by-products of the ketene are obtained.

But even when using low reaction temperatures, e.g., when reacting acetaldehyde with ketene, the process of the invention represents a definite progress, since the catalysts employed represent neutral liquids which are infinitely soluble in the aldehydes. This insures a high efficiency of the catalyst and makes a simple dosaging possible.

Example 1

At the upper end of Raschig ring column 2, whose internal temperature is 50° C., we pipe through line 1 per hour 221.4 weight parts of a mixture consisting of 5.4 weight parts tetra-n-butyl titanate and 216 weight parts butyraldehyde which contains 0.1 weight percent of 2,6-di-tert.-butyl-p-cresol. The runoff obtained at the lower end of column 2 is piped continuously through line 3 to reactor 4 into which we pipe at the same time through line 5 per hour 84 weight parts of gaseous ketene. The reactor temperature is 78–80° C. While the waste gas is piped through line 6 into the lower part of Raschig ring column 2, the resulting conversion mixture is carried hot through the overflow 7 to the vacuum distilling column 8. The reactor waste gas obtained at the head of column 2 through line 9 is practically free of ketene and butyraldehyde. While untransformed butyraldehyde is recovered through line 10, we obtain through line 11 per hour 234 weight parts of a raw, butyraldehyde-free, catalyst-containing and oily reaction product. This is stable and storable at room temperature. The molecular weight of the reaction product is 230–235.

Example 2

244.8 weight parts of a mixture consisting of 4.8 weight parts of tetra-i-butyl titanate and 240 weight parts diethylacetaldehyde containing 0.05 weight percent of 2,6-di-tert.-butyl-p-cresol are piped per hour into the Raschig ring column 2 through line 1. At the same time 84 weight parts of gaseous ketene are piped per hour through line 5 into reactor 4. The reactor temperature is 80–85° C. Through line 7 we pipe per hour 328 weight parts of a hot reaction product containing diethylacetaldehyde and catalyst into the vacuum distilling plant 8. While through line 10 we regain unconverted diethyl acetaldehyde, we obtain through line 11 per hour 289 weight parts of a raw diethylacetaldehyde-free catalyst-containing and oily reaction product. This is stable at room temperature. The determination of molecular weight showed a value of 425–430.

Example 3

306.2 weight parts of a mixture consisting of 6 weight parts tetra-n-propyltitanate and 300 weight parts capronaldehyde containing 0.2 weight percent 2,6-di-tert.-butyl-p-cresol are piped through line 1 into Raschig ring column 2. 84 weight parts of gaseous ketene are piped per hour into reactor 4 through line 5. The reactor temperature is kept at 90° C. The waste gas escaping through line 9 is practically free of ketene. The unconverted capronaldehyde is recovered through line 10. Through line 11 we obtain per hour 291 weight parts of a capronaldehyde-free, catalyst-containing reaction product whose molecular weight is 280–300.

Example 4

Into the Raschig ring column 2 we pipe per hour 238 weight parts of a mixture consisting of 4 weight parts tetra-n-hexyl titanate and 234 weight parts benzaldehyde which contains 0.2 weight percent of 2,6-di-tert.-butyl-p-cresol. Into reactor 4 we pipe per hour 84 weight parts of gaseous ketene through line 5. The reactor temperature is set at 82° C. While through line 10 benzaldehyde is recovered, we obtain through line 11 per hour 300 weight parts of a benzaldehyde-free, catalyst-containing, highly viscous and stable reaction product whose molecular weight is 595–615.

Example 5

Into the Raschig ring column 2 equipped with a water-cooled jacket, we pipe per hour through line 1, 114.4 weight parts of a mixture consisting of 4.4 weight parts tetra-n-butyl titanate and 110 weight parts acetaldehyde. Into reactor 4 we pipe through line 5 per hour 42 weight parts gaseous ketene. The reaction temperature is 20° C. The waste gas obtained through line 9 passes through a suitable cooling zone (−20° C.) and thereafter it is practically free of ketene and acetaldehyde. The distilling column 8 is operated at normal pressure. Unconverted acetaldehyde is obtained through line 10. Through line 11 we obtain per hour 90.0 weight parts of a raw, acetaldehyde-free, but catalyst-containing, viscous and storable reaction product which has a molecular weight of 170 to 180.

The invention claimed is:

1. Process for producing low-polymer reaction products of the general formula

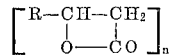

where R=H, alkyl with 1–6 C atoms or phenyl, and $n=2–5$, which comprisess reacting ketene with an aldehyde selected from the group consisting of acrolein, formaldehyde, acetaldehyde, propionaldehyde, n- and iso-butylaldehyde, diethylacetaldehyde, capronic aldehyde, benzaldehyde, m- and p-toluylaldehyde, phenylacetaldehyde and furfural at a temperature of 20–110° C. in the presence as a catalyst of a tetraalkyl titanate where the alkyl groups are straight-chained or branched and contain 2–18 C atoms.

2. Process according to claim 1, in which the catalyst is used in quantities of 0.5–5% referred to the aldehyde used.

3. Process according to claim 1, in which the aldehydes are used in at least stoichiometric quantities.

4. Process according to claim 1, characterized by the fact that the aldehyde, before its reaction with the ketene, is compounded with a quantity of from 0.01 to 1% of 2,6-di-tert.-butyl-p-cresol.

References Cited

UNITED STATES PATENTS

| | | | |
|---|---|---|---|
| 2,462,357 | 2/1949 | Caldwell et al. | 260—343.9 |
| 3,056,818 | 10/1962 | Werber | 252—431 |
| 2,833,755 | 5/1958 | Coover | 252—431 |
| 2,440,498 | 4/1948 | Young | 252—431 |
| 2,424,589 | 7/1947 | Steadman | 260—343.9 |

OTHER REFERENCES

Wagner & Zook, Synthetic Organic Chemistry, 1953, p. 536.

ALEX MAZEL, Primary Examiner

J. A. NARCAVAGE, Assistant Examiner

U.S. Cl. X.R.

260—540